(12) United States Patent
Sasaki

(10) Patent No.: US 7,038,428 B1
(45) Date of Patent: May 2, 2006

(54) CONTROL APPARATUS FOR AUTOMOTIVE GENERATOR

(75) Inventor: Junya Sasaki, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 11/244,296

(22) Filed: Oct. 6, 2005

(30) Foreign Application Priority Data

Apr. 21, 2005 (JP) .............................. 2005-123514

(51) Int. Cl.
*H02P 9/10* (2006.01)

(52) U.S. Cl. ............................ 322/22; 322/17; 322/24; 322/25; 322/26; 322/27; 322/29

(58) Field of Classification Search ................. 322/17, 322/22, 24, 25, 26, 27, 29
See application file for complete search history.

(56) References Cited

U.S. PATENT DOCUMENTS

| | | | |
|---|---|---|---|
| 6,072,302 A * | 6/2000 | Underwood et al. ........... 322/17 |
| 6,215,285 B1 * | 4/2001 | Harmon ........................ 322/29 |
| 6,707,278 B1 * | 3/2004 | Harmon ........................ 322/37 |
| 6,710,580 B1 * | 3/2004 | Shinba ........................ 322/37 |
| 6,750,634 B1 * | 6/2004 | Taniguchi et al. ............ 322/28 |
| 6,750,635 B1 * | 6/2004 | Harmon ........................ 322/29 |

FOREIGN PATENT DOCUMENTS

| JP | 60-181200 U | 12/1985 |
|---|---|---|
| JP | 2001-258295 A | 9/2001 |

* cited by examiner

*Primary Examiner*—Darren Schuberg
*Assistant Examiner*—Iraj A. Mohandesi
(74) *Attorney, Agent, or Firm*—Sughrue Mion, PLLC

(57) ABSTRACT

A DF signal averaging circuit includes a counter for counting a clock signal fed from a clock signal generator, an OR circuit which causes the counter to perform count-up operation only when a transistor is in an ON state with the clock signal and a potential signal fed from the clock signal generator and a positive electrode of the transistor, respectively, a memory circuit for calculating an averaged DF signal from output values of the counter with specific timing, and a preset control circuit for calculating a preset value for the counter from the averaged DF signal fed from the memory circuit and setting the preset value in the counter with specific timing. The averaged DF signal output from the memory circuit is transmitted to an external control unit which is an ECU of a vehicle via a communication interface.

3 Claims, 4 Drawing Sheets

CONTROL APPARATUS FOR AUTOMOTIVE GENERATOR

BACKGROUND OF THE INVENTION

1. Field of the Invention

The present invention relates to a control apparatus for controlling an automotive generator installed on a vehicle according to field switching rate of a field circuit of the generator and, more particularly, the invention pertains to an automotive generator control apparatus which can perform operation for averaging changing values of field switching rate with a simple configuration.

2. Description of the Background Art

Conventionally, an electronic control unit (ECU) for controlling a vehicle engine monitors field switching rate (or field coil duty factor) of an automotive generator. The ECU controls field current ON/OFF states to maintain the amount of power generated by the automotive generator at a proper level based on a field coil duty factor signal (hereinafter referred to as the DF signal) which is generated by a regulator of the generator.

Generally, the DF signal directly indicates ON/OFF (conducted or non-conducted) states of a field current switching device, or a switching transistor. Switching on/off operation of the switching transistor serving as the field current switching device is controlled by a pulse width modulation (PWM) control method performed at a frequency of about 50 Hz to 200 Hz by the regulator, wherein the field coil duty factor normally varies from one cycle to next of PWM control operation. In most cases, the DF signal takes erratically changing values, such as 50%, 70%, 10%, and so on, over successive PWM control operation cycles while the generator is in operation.

Since the DF signal, which is an input parameter for controlling the generator, takes such erratically changing values even if the DF signal is monitored at intervals of a specific number of PWM control operation cycles, operation for controlling the generator is apt to become unstable and unreliable.

Therefore, if the DF signal of which value varies so significantly is to be used for controlling the generator, it is necessary to perform a certain form or averaging operation.

For example, Japanese Laid-open Utility Model Publication No. 1985-181200 discloses an arrangement for solving the aforementioned problem, in which a DF signal is transmitted to an ECU and values of the DF signal are processed by a mathematical operation performed by the ECU to produce a control parameter used for controlling a generator.

On the other hand, Japanese Laid-open Patent Application No. 2001-258295 discloses an arrangement for solving the aforementioned problem, in which a generator regulator includes as means for reading a DF signal on the regulator side an averaging circuit including an average value latch circuit such that effects of an input signal of which recurring cycles have been disturbed by external noise would be mitigated.

When applied to a control apparatus for controlling an automotive generator by use of the DF signal, the aforementioned arrangement of Japanese Laid-open Utility Model Publication No. 1985-181200 has a problem that the ECU must take great work load in executing the mathematical operation needed for producing an easy-to-use control parameter from the DF signal, for example.

The aforementioned arrangement of Japanese Laid-open Patent Application No. 2001-258295 when applied to an automotive generator control apparatus requires the provision of an averaging circuit including an average value latch circuit. Although the conventional averaging circuit can efficiently smooth out changing values of the DF signal, it is necessary to install a memory having a large storage capacity. Additionally, the averaging circuit must have an adder circuit and a subtracter circuit and, thus, this approach results in an increase in circuit scale and an eventual cost increase.

SUMMARY OF THE INVENTION

Intended to overcome the aforementioned problems of the prior art, the invention has as an object the provision of an automotive generator control apparatus capable of averaging changing values of a DF signal and thereby relieve work load applied to an ECU with a simple circuit configuration.

According to the invention, a control apparatus for controlling an automotive generator includes a field coil to which a DC output voltage of the automotive generator is supplied, a switching device connected in series with the field coil, whereby switching on/off action of the switching device controls a field current flowing through the field coil, a diode connected in parallel with the field coil for recirculating the field current flowing through the field coil when the switching device is in an OFF state, a voltage control circuit for outputting an ON/OFF drive signal to the switching device such that the DC output voltage of the automotive generator follows a specific reference voltage by PWM control operation performed at specific recurring cycles, and DF signal averaging means for averaging values of a DF signal changing with the switching on/off action of the switching device and outputting an averaged DF signal. The DF signal averaging means includes a counter, a counter control circuit which causes the counter to perform count-up operation when the switching device is in an ON state, a memory circuit which operates at a specific number $2^n$ of averaging cycles of the PWM control operation, where n is a positive integer, to calculate a value of the averaged DF signal by shifting bits of each successive digital output of the counter and thereby multiplying a digital output value of the counter by $\frac{1}{2}^{n+1}$, store the value of the averaged DF signal thus calculated, overwriting a previously stored averaged DF signal value, and output the newly calculated averaged DF signal value, and a preset control circuit which operates at the aforementioned specific number $2^n$ of PWM control operation cycles to calculate a preset value for the counter by shifting bits of the averaged DF signal value output from the memory circuit and thereby multiplying the averaged DF signal value by $2^n$, and set the preset value in the counter.

In the aforementioned automotive generator control apparatus of the invention, the DF signal averaging means is configured such that addition is performed by counting operation of the counter and division and multiplication are performed by the aforementioned bit-shifting operation, so that the control apparatus of the invention does not require any dedicated adding, dividing or multiplying means. Therefore, the automotive generator control apparatus of the invention can perform operation for averaging changing values of the DF signal with a simple circuit configuration at low cost.

These and other objects, features and advantages of the invention will become more apparent upon reading the following detailed description along with the accompanying drawings.

DETAILED DESCRIPTION OF THE PREFERRED EMBODIMENTS OF THE INVENTION

The invention is now described with reference to specific embodiments thereof illustrated in the accompanying drawings.

First Embodiment

Figure 1:
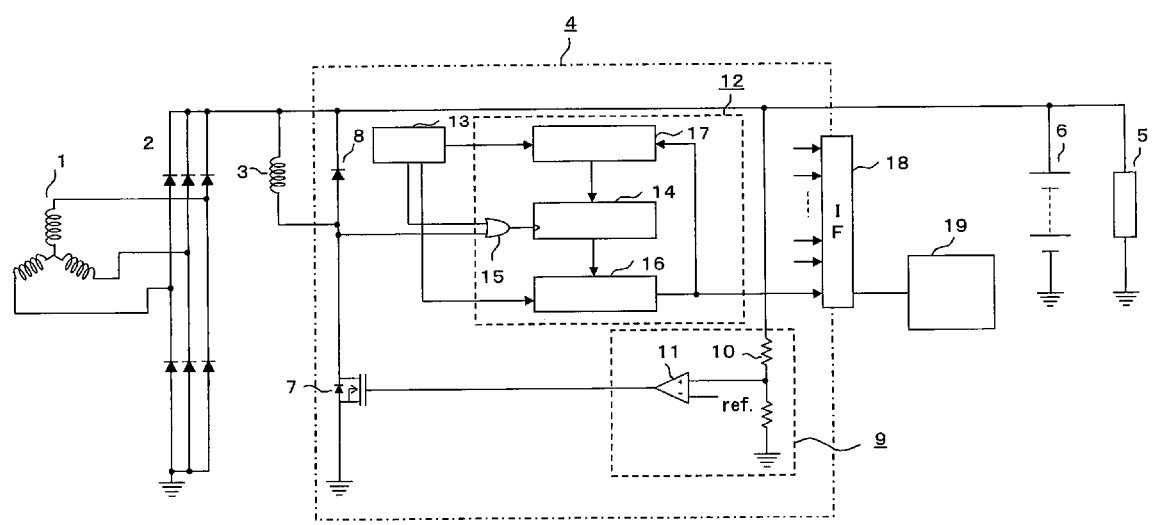
FIG. 1 is a block diagram of a control apparatus for controlling an automotive generator installed on a vehicle according to a first embodiment of the invention.

FIG. 1 is a block diagram of a control apparatus for controlling an automotive generator installed on a vehicle according to a first embodiment of the invention.

The automotive generator of the embodiment includes three-phase armature coils 1, a rectifier 2 for rectifying AC voltages output from the armature coils 1 to produce a DC voltage, a field coil 3 constituting a field circuit into which the DC voltage output from the rectifier 2 is supplied, and a voltage regulator 4 which will be later described in detail. The DC output voltage regulated to a constant voltage level by the voltage regulator 4 is supplied to various electric loads 5 and to a battery 6 for charging the same.

Next, an internal circuit configuration of the voltage regulator 4 which is enclosed by alternate long and short dashed lines is described. Referring to FIG. 1, the voltage regulator 4 includes a transistor 7 connected in series with the field coil 3, a diode 8 connected in parallel with the field coil 3, a voltage control circuit 9 which is enclosed by broken lines, and a DF signal averaging circuit 12 which is also enclosed by broken lines.

The transistor 7 serves as a switching device of which switching on/off operation controls a field current flowing through the field coil 3. The diode 8 serves as a freewheeling diode for recirculating the current fed through the field coil 3 when the transistor 7 is in an OFF state.

The voltage control circuit 9 includes a resistance type voltage divider 10 for dividing the DC voltage output from the voltage regulator 4, and a comparator 11 for comparing a divided voltage fed from the resistance type voltage divider 10 and a reference voltage Vr and outputting a result of comparison. Although not illustrated in detail, an ON/OFF drive signal (DF signal) produced from a signal fed from the comparator 11 by PWM control operation performed at specific pulse repetition intervals (or recurring cycles) is output to the transistor 7 such that the aforementioned DC voltage output from the voltage regulator 4 will follow a specific reference voltage.

Now, an internal circuit configuration of the DF signal averaging circuit 12 which is DF signal averaging means constituting a principal part of the invention is described. The DF signal averaging circuit 12 averages greatly changing values of the DF signal and outputs an averaged DF signal. More specifically, the DF signal averaging circuit 12 includes a counter 14 for counting a clock signal fed from the clock signal generator 13, an OR circuit 15 serving as a counter control circuit which causes the counter 14 to perform count-up operation only when the transistor 7 is in an ON state with the clock signal and a potential signal fed from the clock signal generator 13 and a positive electrode of the transistor 7, respectively, a memory circuit 16 for calculating the averaged DF signal from output values of the counter 14 with specific timing, and a preset control circuit 17 for calculating a preset value for the counter 14 from the averaged DF signal fed from the memory circuit 16 and setting the preset value in the counter 14 with specific timing.

The averaged DF signal output from the memory circuit 16 is transmitted to an external control unit 19 which is an ECU of the vehicle via a communication interface 18.

Figure 2:
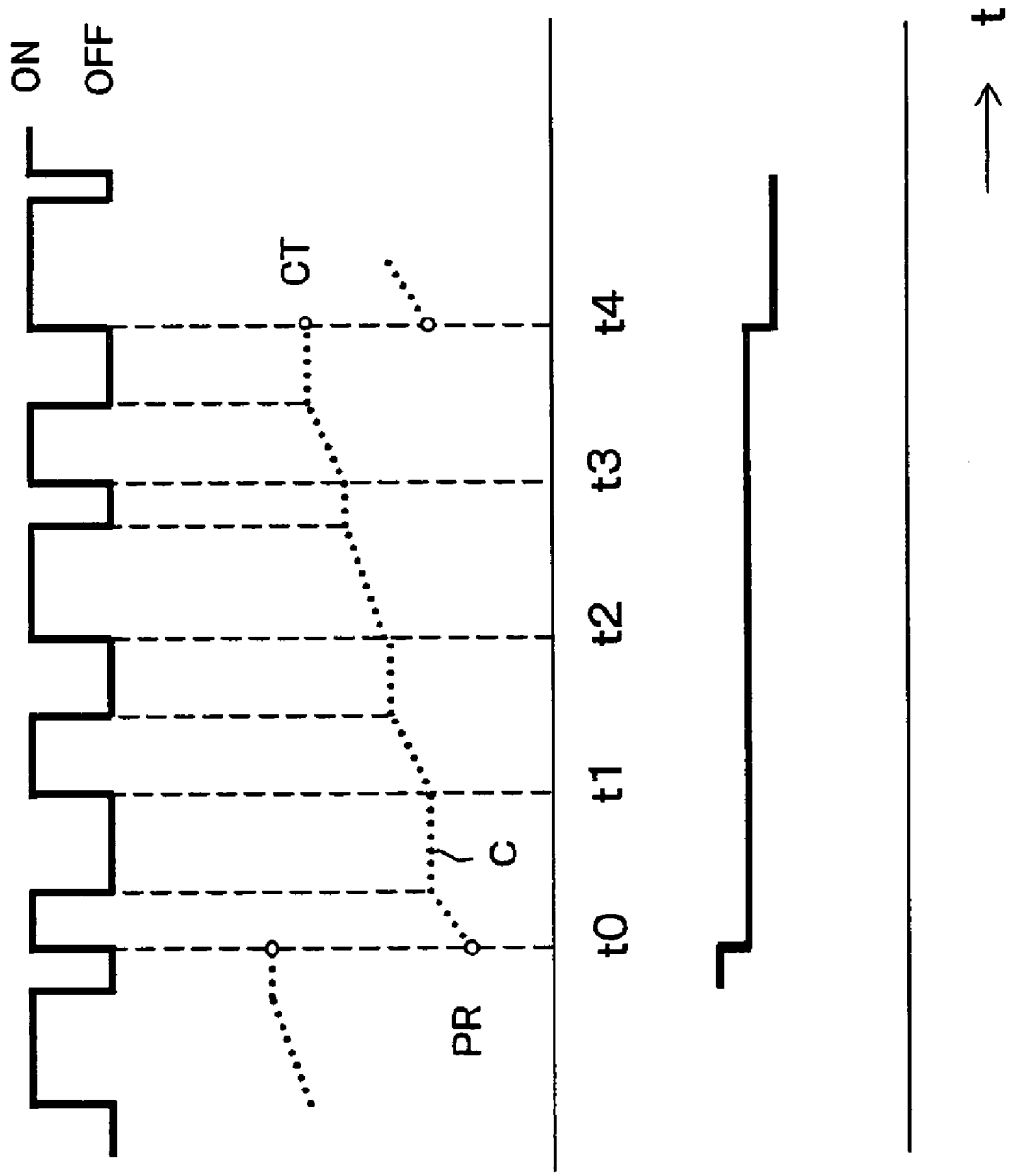
FIGS. 2A–2C are diagrams showing operation of a DF signal averaging circuit of the control apparatus of FIG. 1.

Operation of the control apparatus of the embodiment is now explained. The voltage control circuit 9 outputs the DF signal which is the ON/OFF drive signal to the transistor 7, in which the duration of on-time of successive pulses of the ON/OFF drive signal is controlled by the PWM control operation according to the signal output from the comparator 11 in such a manner that the DC voltage output from the voltage regulator 4 will follow the aforementioned specific reference voltage. FIG. 2A shows an example of a waveform of the DF signal.

Next, operation of the DF signal averaging circuit 12 is explained. FIGS. 2A–2C are diagrams showing an example of waveforms of signals observed at various points in the voltage regulator 4. Specifically, FIG. 2A shows the waveform of the DF signal supplied to the transistor 7 as mentioned above, FIG. 2B shows the output values of the counter 14 obtained when the DF signal shown in FIG. 2A is input into the DF signal averaging circuit 12, and FIG. 2C shows the waveform of the output signal of the DF signal averaging circuit 12, that is, the averaged DF signal obtained by averaging the changing values of the DF signal shown in FIG. 2A.

Figure 3:
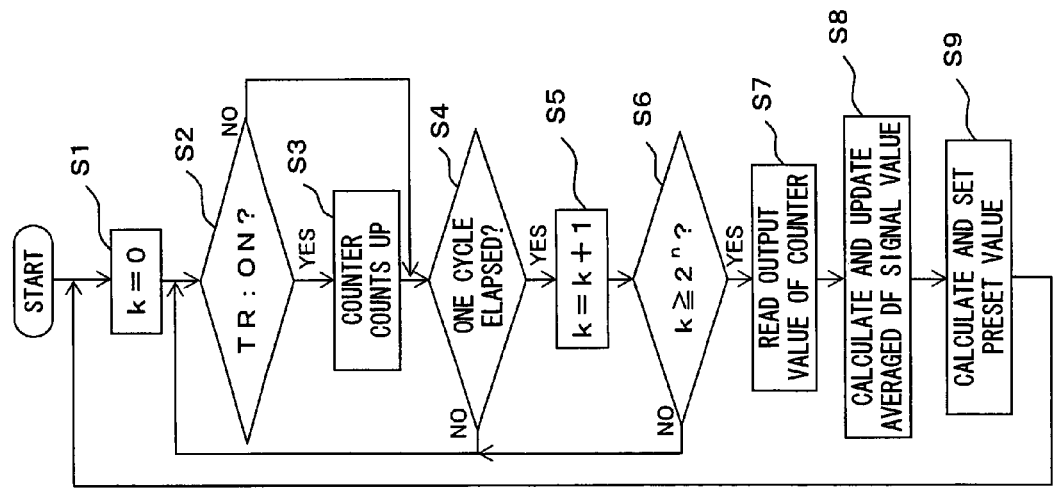
FIG. 3 is a flowchart showing the operation of the DF signal averaging circuit of the control apparatus of FIG. 1.

Referring to a flowchart of FIG. 3 and the waveforms of FIGS. 2A–2C, the operation of the control apparatus of the present embodiment is described in detail. In the following discussion, an interval of averaging operation performed by the DF signal averaging circuit 12 is $2^n$. In the example of FIGS. 2A–2C, n=2 so that the averaging interval is assumed to be $2^2=4$.

At the beginning of the averaging operation, an accumulated number k of cycles of the PWM control operation (hereinafter referred to as PWM cycles) is initialized, or set to zero (k=0), in step S1. In the example of FIGS. 2A–2C, the number k varies as follows: 0, 1, 2, 3, 4, 0, 1, 2, . . . , and so on.

If the transistor 7 is currently in an ON period in step S2, the counter 14 counts the clock signal in step S3. If the transistor 7 is currently in an OFF period, on the contrary, the counter 14 does not perform this count-up operation and the DF signal averaging circuit 12 proceeds to step S4, in which a judgment is made to determine whether one PWM cycle has elapsed. Steps S2 and S3 are repeatedly executed until one PWM cycle elapses.

The foregoing sequence corresponds to a period from time t0 to time t1 in FIGS. 2A–2C. This means that an output value C of the counter 14 increases at a constant gradient during each ON period of the ON/OFF drive signal and remains unchanged during each OFF period as the counter 14 stops counting the clock signal. A preset value PR is set in the counter 14 at time t0 as will be later discussed.

If one PWM cycle is judged to have elapsed in step S4, the number k is incremented by one in step S5 and the DF signal averaging circuit 12 proceeds to step S6, and steps S2 to S3 are repeatedly executed until the accumulated number k becomes equal to $2^n$ (k=4 in the example of FIGS. 2A–2C).

The foregoing sequence corresponds to a period from time t0 to time t4 in FIGS. 2A–2C. The output of the counter 14 increases as the DF signal is integrated in each successive PWM cycle during this sequence from time t0 to time t4.

If the number k is judged to be equal to or larger than $2^n$ (k$\geq 2^n$) in step S6, the DF signal averaging circuit 12 proceeds to step S7, in which the memory circuit 16 reads out an output value CT of the counter 14 at time t4 shown in FIGS. 2A–2C.

$$CT=PR+C1+C2+C3+C4$$

where C1 to C4 are increments of the output value of the counter 14 over four successive PWM cycles from time t0 to time t4 shown in FIGS. 2A–2C.

Then, in step S8, the memory circuit 16 calculates a value DF of the averaged DF signal by the following equation and this value DF is stored in the memory circuit 16, overwriting a previously stored averaged DF signal value:

$$DF=CT(\tfrac{1}{2}^{n+1})$$

While the aforementioned mathematical operation is substantially division, the equation includes the (n+1)th power of 2 as a denominator. Therefore, it is only necessary to shift down the digital output value CT of the counter 14 by as much as (n+1) bits (three bits in the example of FIGS. 2A–2C) and there is no need for a function of division realized by hardware.

In a succeeding step S9, the preset control circuit 17 calculates the preset value PR by the following equation and the preset value PR thus calculated is set in the preset control circuit 17, overwriting a previously set preset value PR:

$$PR=DF\times 2^n$$

This mathematical operation (substantially multiplication) can be performed by simply shifting up the value DF of the averaged DF signal by as much as n bits (two bits in the example of FIGS. 2A–2C), so that there is no need for a function of multiplication realized by hardware.

At this point, operation for updating the value DF of the averaged DF signal to be output by the DF signal averaging circuit 12 is finished and the DF signal averaging circuit 12 returns to step S1 and reexecutes the operation for further updating. FIG. 2C shows the waveform of the value DF of the averaged DF signal.

It is appreciated from the foregoing discussion that the automotive generator control apparatus of the first embodiment can generate a smoothly varying DF signal by averaging the DF signal values erratically changing over successive PWM cycles with a simple circuit configuration and thereby mitigate work load applied to the ECU of the vehicle. In particular, adding operation which is generally necessary for carrying out the averaging operation is performed by the counter 14 as the counter 14 continuously counts the clock signal during the successive PWM cycles and, therefore, the control apparatus of the present embodiment does not require any dedicated adding means. In addition, operations of division and multiplication are performed by the aforementioned bit-shifting operation, so that the control apparatus of the embodiment does not require any dedicated dividing or multiplying means. As a result, the automotive generator control apparatus of the embodiment can perform the averaging operation with an extremely simple circuit configuration at low cost.

While the aforementioned exponent n can be set to any arbitrary number, the exponent n must be set to an optimum number in due consideration of characteristics of variations in the ON/OFF drive signal supplied to the transistor 7 from which the DF signal is derived, a conducting time constant of the field circuit including the field coil 3 and how the DF signal is used by the external control unit 19 (ECU).

Second Embodiment

Figure 4:
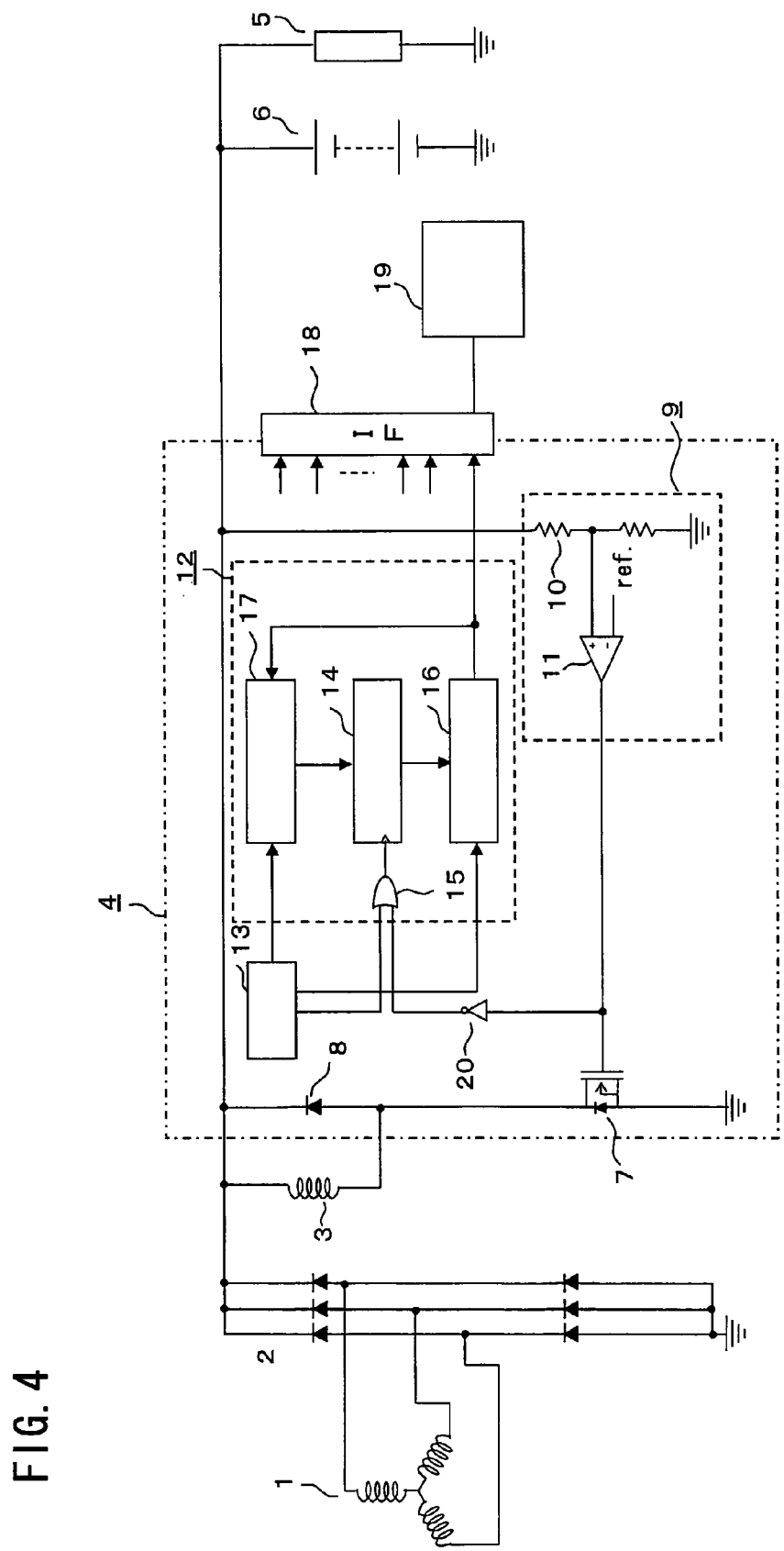
FIG. 4 is a block diagram of a control apparatus for controlling an automotive generator installed on a vehicle according to a second embodiment of the invention.

FIG. 4 is a block diagram of a control apparatus for controlling an automotive generator installed on a vehicle according to a second embodiment of the invention. In FIG. 4, elements identical or equivalent to those shown in FIG. 1 are designated by the same reference numerals. The only difference of the automotive generator control apparatus of the second embodiment (FIG. 4) from that of the first embodiment (FIG. 1) lies in the counter control circuit for controlling the counter 14.

Specifically, while output potential of the transistor 7 is fed into the counter control circuit in the first embodiment, the ON/OFF drive signal output from the voltage control circuit 9 is fed into the counter control circuit for producing a clock signal to be supplied to the counter 14 in the second embodiment. The output potential of the transistor 7 and the ON/OFF drive signal supplied thereto show opposite polarities when the transistor 7 is turned on and off. For this reason, a polarity reversing circuit 20 is inserted in a line for supplying the ON/OFF drive signal to the counter control circuit in the second embodiment, whereby a clock signal output from the clock signal generator 13 is fed into the counter 14 only when the transistor 7 is in an ON state.

Consequently, the counter control circuit can be configured without establishing a direct connection to a main circuit through which the field current actually flows in the second embodiment as illustrated in FIG. 4, so that the configuration of the automotive generator control apparatus is more simplified. The automotive generator control apparatus of the second embodiment thus configured produces completely the same advantages as that of the first embodiment by making it possible to perform operation for averaging changing values of the DF signal with a simple circuit configuration at low cost.

In summary, a control apparatus of the invention for controlling an automotive generator includes a field coil to which a DC output voltage of the automotive generator is supplied, a switching device connected in series with the field coil, whereby switching on/off action of the switching device controls a field current flowing through the field coil, a diode connected in parallel with the field coil for recirculating the field current flowing through the field coil when the switching device is in an OFF state, a voltage control circuit for outputting an ON/OFF drive signal to the switching device such that the DC output voltage of the automotive generator follows a specific reference voltage by PWM control operation performed at specific recurring cycles, and DF signal averaging means for averaging values of a DF signal changing with the switching on/off action of the switching device and outputting an averaged DF signal. The DF signal averaging means of this automotive generator control apparatus includes a counter, a counter control circuit which causes the counter to perform count-up operation when the switching device is in an ON state, a memory circuit which operates at a specific number $2^n$ of averaging cycles of the PWM control operation, where n is a positive integer, to calculate a value of the averaged DF signal by shifting bits of each successive digital output of the counter and thereby multiplying a digital output value of the counter by $\frac{1}{2}^{n+1}$, store the value of the averaged DF signal thus calculated, overwriting a previously stored averaged DF signal value, and output the newly calculated averaged DF signal value, and a preset control circuit which operates at the aforementioned specific number $2^n$ of PWM control operation cycles to calculate a preset value for the counter by shifting bits of the averaged DF signal value output from the memory circuit and thereby multiplying the averaged DF signal value by $2^n$, and set the preset value in the counter.

In one feature of the invention, one electrode of the switching device is grounded, a signal representing potential of another electrode of the switching device and a clock signal of a specific frequency are input into the counter control circuit, and the counter control circuit outputs the clock signal to the counter only when the switching device is in the ON state.

This feature of the invention ensures that the counter counts the clock signal only when the switching device is in the ON state.

In another feature of the invention, the ON/OFF drive signal supplied to the switching device and a clock signal of a specific frequency are input into the counter control circuit, and the counter control circuit outputs the clock signal to the counter only when the switching device is in the ON state.

According to this feature of the invention, the counter control circuit can be configured without establishing a direct connection to a main circuit through which the field current actually flows, so that the configuration of the automotive generator control apparatus is more simplified.

While the invention has been described with reference to the specific embodiments thereof in which the invention is applied to the field circuit of the automotive generator, the invention is also applicable to other types of generators such as those in which a DC output voltage of the generator is supplied to the field coil. Additionally, the switching device need not necessarily be a transistor shown in the foregoing embodiments. Even if other type of switching device than the transistor is used in the generator, the invention is applicable in the same way as thus far discussed, yet offering the same advantages as in the foregoing embodiments.

What is claimed is:

1. A control apparatus for controlling an automotive generator, said control apparatus comprising:
    a field coil to which a DC output voltage of the automotive generator is supplied;
    a switching device connected in series with said field coil, whereby switching on/off action of said switching device controls a field current flowing through said field coil;
    a diode connected in parallel with said field coil for recirculating the field current flowing through said field coil when said switching device is in an OFF state;
    a voltage control circuit for outputting an ON/OFF drive signal to said switching device such that the DC output voltage of the automotive generator follows a specific reference voltage by PWM control operation performed at specific recurring cycles; and
    DF signal averaging means for averaging values of a DF signal changing with the switching on/off action of said switching device and outputting an averaged DF signal;
    wherein said DF signal averaging means includes:
        a counter;
        a counter control circuit which causes said counter to perform count-up operation when said switching device is in an ON state;
        a memory circuit which operates at a specific number $2^n$ of averaging cycles of the PWM control operation, where n is a positive integer, to calculate a value of the averaged DF signal by shifting bits of each successive digital output of said counter and thereby multiplying a digital output value of said counter by $\frac{1}{2}^{n+1}$, store the value of the averaged DF signal thus calculated, overwriting a previously stored averaged DF signal value, and output the newly calculated averaged DF signal value; and
        a preset control circuit which operates at said specific number $2^n$ of PWM control operation cycles to calculate a preset value for said counter by shifting bits of the averaged DF signal value output from said memory circuit and thereby multiplying the averaged DF signal value by $2^n$, and set the preset value in said counter.

2. The control apparatus according to claim 1, wherein one electrode of said switching device is grounded, a signal representing potential of another electrode of said switching device and a clock signal of a specific frequency are input into said counter control circuit, and said counter control circuit outputs the clock signal to said counter only when said switching device is in the ON state.

3. The control apparatus according to claim 1, wherein the ON/OFF drive signal supplied to said switching device and a clock signal of a specific frequency are input into said counter control circuit, and said counter control circuit outputs the clock signal to said counter only when said switching device is in the ON state.

* * * * *